United States Patent [19]
Swarup et al.

[11] Patent Number: 6,087,464
[45] Date of Patent: *Jul. 11, 2000

[54] POLYMERIC VEHICLES WHICH INCLUDE A POLYOL, A PHENOLIC ESTER ALCOHOL AND ISOCYANATE COMPOUND

[75] Inventors: Vijay Swarup, Houston, Tex.; Frank N. Jones, Ann Arbor, Mich.; Albert I. Yezrielev, Houston, Tex.; Ramachandran P. Subrayan, Ypsilanti, Mich.

[73] Assignee: Exxon Chemical Patents, Inc., Baytown, Tex.

[*] Notice: This patent is subject to a terminal disclaimer.

[21] Appl. No.: 08/621,171

[22] Filed: Mar. 21, 1996

Related U.S. Application Data

[63] Continuation-in-part of application No. 08/424,205, Apr. 19, 1995, Pat. No. 5,681,906.

[51] Int. Cl.[7] .......................... C08G 18/42; C08G 18/58; C08G 18/62; C08G 18/32
[52] U.S. Cl. .......................... 528/73; 525/123; 525/124; 525/131; 525/440; 525/454; 525/455; 525/528; 528/80; 528/81; 528/83; 528/85
[58] Field of Search ....................... 525/440, 123, 525/124, 131, 454, 455, 528; 528/80, 83, 85, 81, 73

[56] References Cited

U.S. PATENT DOCUMENTS

| | | | |
|---|---|---|---|
| 3,409,579 | 11/1968 | Robins | 523/143 |
| 3,789,044 | 1/1974 | Taft et al. | 528/73 |
| 3,836,491 | 9/1974 | Taft et al. | 528/53 |
| 4,031,068 | 6/1977 | Cantor | 525/351 |
| 4,130,549 | 12/1978 | Ueno et al. | 528/93 |
| 4,331,782 | 5/1982 | Linden | 525/173 |
| 4,343,839 | 8/1982 | Blegan | 427/340 |
| 4,365,039 | 12/1982 | Blegan | 524/773 |
| 4,374,167 | 2/1983 | Blegan | 428/141 |
| 4,374,181 | 2/1983 | Blegen | 428/423.3 |
| 4,877,838 | 10/1989 | Toman | 525/107 |
| 4,888,441 | 12/1989 | Calbo, Jr. et al. | 560/198 |
| 4,922,002 | 5/1990 | Calbo, Jr. et al. | 528/286 |
| 5,019,100 | 5/1991 | Hennink et al. | 623/6 |
| 5,166,289 | 11/1992 | Yezrielev et al. | 525/443 |
| 5,210,155 | 5/1993 | Yezrielev et al. | 525/442 |
| 5,235,006 | 8/1993 | Jones et al. | 525/510 |
| 5,239,018 | 8/1993 | Yezrielev et al. | 525/418 |
| 5,322,884 | 6/1994 | Wellman et al. | 524/601 |
| 5,326,831 | 7/1994 | Yezrielev et al. | 525/437 |
| 5,334,652 | 8/1994 | Wellman et al. | 524/601 |
| 5,334,671 | 8/1994 | Yezrielev et al. | 525/443 |
| 5,453,469 | 9/1995 | Yezrielev et al. | 525/418 |
| 5,458,920 | 10/1995 | Yezrielev et al. | 427/385.5 |
| 5,681,906 | 10/1997 | Yezreilev et al. | 525/450 |

FOREIGN PATENT DOCUMENTS

| | | |
|---|---|---|
| 0419088 | 3/1991 | European Pat. Off. . |
| 2809768 | 9/1978 | Germany . |
| 05155840 | 6/1993 | Japan . |
| 1290848 | 9/1972 | United Kingdom . |
| 96/23016 | 8/1996 | WIPO . |
| 96/23034 | 8/1996 | WIPO . |
| 96/23035 | 8/1996 | WIPO . |

OTHER PUBLICATIONS

Swarup, et al., "Thermoset Coating Compositions Having Improved Hardness," Research Disclosure No. 374, pp. 446–457, (Jun. 1995), Kenneth Mason Publications, Ltd., Hampshire, England.

Stumpe et al., "Deactivation of Excited States in Polyurethanes by Energy Transfer to Salicylic Acid Derivatives and its Application to the Photo–stabilisation of Polyurethanes", Polymer Degradation and Stability 17 (1987) 103–115.

*Primary Examiner*—Rabon Sergent
*Attorney, Agent, or Firm*—Fitch, Even, Tabin & Flannery

[57] ABSTRACT

The present invention is directed to a polymeric vehicle, a formulated coating composition and a coating binder made from the polymeric vehicle and a method for making the polymeric vehicle where the polymeric vehicle includes a polyol, an isocyanate compound and a phenolic ester alcohol having at least one aliphatic hydroxyl group and at least one phenolic hydroxyl group.

27 Claims, No Drawings

POLYMERIC VEHICLES WHICH INCLUDE A POLYOL, A PHENOLIC ESTER ALCOHOL AND ISOCYANATE COMPOUND

This application is a Continuation-In-Part application of Ser. No. 424,205 filed Apr. 19, 1995 now U.S. Pat. No. 5,681,906.

FIELD OF THE INVENTION

The present invention relates to polymeric vehicles for coating films or binders where the polymeric vehicles are thermosetting and include at least one phenolic ester alcohol, at least one polyol and at least one isocyanate compound with multi-isocyanate functionality. In an important aspect, the invention is directed to polymeric vehicles which include at least one phenolic ester alcohol, at least one isocyanate compound with multi-isocyanate functionality, at least one polyol and at least one amino resin.

BACKGROUND OF THE INVENTION AND DESCRIPTION OF THE PRIOR ART

One of the primary components in paint is the "film former" that provides a film for the protective function of a substrate coated with paint. Film forming components of liquid paints include resins which have required organic solvents to provide the resins with suitable viscosities such that the paint can be applied by existing commercial application equipment. Use of solvents, however, raises at least two problems. First, in the past and potentially in the future, petrochemical shortages mitigate against the use of organic solvent in great volumes. Second, environmental concern mitigates against the use of organic solvents and requires such use be minimized.

Thermosetting coating compositions, particularly coating compositions which include polyester, alkyd, acrylic and epoxy polymers are often materials of choice for making film formers for various substrates to which the coating composition is applied. Coating compositions provide a protective function for the substrate. Hence, coating compositions are generally formulated to provide a balance of properties which will maximize hardness, flexibility, hydrolytic stability, solvent resistance, corrosion resistance, weatherability, acid resistance and gloss, with emphasis on certain properties depending upon the purpose for which the coating is intended.

It has been a continuing challenge to provide coating compositions which upon thermosetting provide films with desired film properties such as hardness, flexibility, solvent resistance, acid resistance, corrosion resistance, hydrolytic stability, weatherability and gloss, reduce VOCs and still retain the ability to have the viscosities of the polymeric vehicle and formulated coating composition made therefrom such that the formulated coating composition can be applied with existing commercial application equipment.

U.S. Pat. No. 4,331,782 to Linden, U.S. Pat. Nos. 3,836,491 and 3,789,044 to Taft et al. and U.S. Pat. No. 3,409,579 to Robbins describe phenol capped polymers which are crosslinked with polyisocyanates. They do not involve the use of a phenolic ester alcohol which includes a phenolic hydroxyl group and an aliphatic hydroxyl group in combination with an isocyanate compound with multi-isocyanate functionality and/or polyol as described herein.

OBJECTS OF THE INVENTION

It is an object of the invention to provide a coating composition which will maximize film properties such as hardness, hydrolytic stability, weatherability, flexibility, solvent resistance, corrosion resistance, acid resistance and gloss.

It is an object of the invention to provide a coating composition which will not sag or minimize sagging during the curing process to provide a coating binder.

It is another object of the invention to provide a coating composition which will be low in VOCs.

It is an object of this invention to provide formulated compositions which are solventless or which are thinned by organic solvents and/or water.

Further objects and advantages of the invention will be found by reference to the following description.

SUMMARY OF THE INVENTION

The present invention is directed to a polymeric vehicle, a formulated coating composition and a coating binder made from the polymeric vehicle and a method for making the polymeric vehicle where the polymeric vehicle includes at least one phenolic ester alcohol having at least one phenolic hydroxyl group and at least one aliphatic hydroxyl group; at least one polyol having a polydispersity index (PDI) of greater than one; and at least one isocyanate compound having an average of more than one reactive isocyanate per molecule. The latter combination enhances film properties such as hardness, hydrolytic stability, corrosion resistance and weatherability. In the polymeric vehicle, the polyol has an average hydroxyl functionality of from about 2 to about 100 hydroxyls per molecule, a PDI of greater than 1 and a molecular weight of at least 200. In an important aspect the polyol is a polyester, alkyd or acrylic polymer. The isocyanate compound has an isocyanate functionality of from about 1.9 to about 20 isocyanate groups per molecule. The isocyanate serves to crosslink and interconnect the polyol and the phenolic ester alcohol as follows: PHEA-isocyanate-polyol. The isocyanate functionality is reactive with the hydroxyls of the phenolic ester alcohol and polyols. When the phenolic ester alcohol, polyol and isocyanate compound are at low molecular weights, they may be blended in amounts effective for the blend providing a polymeric vehicle and/or formulated coating composition having less than about 3.5 pounds per gallons of composition.

In another important aspect, the polymeric vehicle includes an amino resin having a crosslinking functionality of from about 3 to about 30 crosslinking groups per molecule blended with the phenolic ester alcohol, isocyanate compound and polyol. It is preferred that the isocyanate compound has an average isocyanate functionality of about 2 or 3. In this aspect of the invention, when the number of equivalents of the isocyanate functionality of the isocyanate compound is about 100 percent or less of the number of equivalents of aliphatic hydroxyls in the blend, the isocyanate group generally reacts with the aliphatic hydroxyl group of the PHEA and polyol and the phenolic hydroxyl group reacts with the amino resin to provide a crosslinked structure with the following components which are connected to provide predominantly the following linkages: Polyol residue/isocyanate residue/aliphatic end of PHEA residue; phenolic end of PHEA residue/amino resin. It is believed that the aliphatic hydroxyl of the PHEA reacts first with the isocyanate compound to build viscosity to reduce or eliminate sagging. Thereafter, the phenolic hydroxyl group of the PHEA reacts with the melamine resin to provide exceptional hardness properties to the resulting coating binder.

In an important aspect, the phenolic ester alcohol has the general formula which includes at least two ester linkages and at least one aliphatic hydroxyl group which is a secondary or primary hydroxyl group and which is described in the following general formula

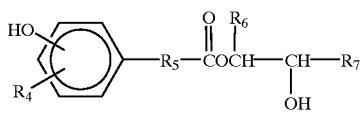

wherein $R_4$ is selected from the group consisting of hydrogen, halogen, hydroxyl, $C_1$ to $C_8$ alkyl and $C_1$ to $C_8$ alkoxy, $R_5$ is a direct bond or a $C_1$ to $C_{20}$ organic radical which may incorporate another phenol, aliphatic hydroxyl, ester, ether and/or carbonate group in its structure, $R_6$ is hydrogen or a $C_1$ to $C_{20}$ organic radical which may include an ester group, or a direct bond which may form with $R_7$ part of a 5 or 6 carbon atom cyclic ring structure, $R_7$ is $CH_2R_8$ wherein $R_8$ is selected from the group consisting of hydroxy, $OR_9$, $OOCR_{10}$ and $R_{11}$ wherein $R_9$ is a primary or secondary aliphatic group containing 3 to 20 carbon atoms which may include one or more ester linkages or an aromatic group containing 6 to 20 carbon atoms, $R_{10}$ is a primary, secondary or tertiary aliphatic group containing 4 to 20 carbon atoms which may include one or more ester linkages or an aromatic group containing 6 to 20 carbon atoms, and $R_{11}$ is a $C_2$ to $C_{20}$ organic radical which may include one or more ester linkages and where the organic radical may form with $R_6$ part of a 5 or 6 carbon atom cyclic ring structure. In a particularly important aspect $R_5$ or $R_8$ has the ester groups. The —OH expressly shown in formula A is illustrative of an aliphatic hydroxyl group.

In another important aspect of the invention, the phenolic ester alcohol is the reaction product of hydroxybenzoic acid, such as para hydroxybenzoic acid, and a monoglycidyl compound having a molecular weight in the range of from about 110 to 1000 such as the monoglycidyl compound with the formula ("B")

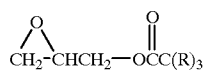

where R represents a mixture of aliphatic groups, most preferably the three R groups in the glycidyl compound having a total of 8 carbon atoms. Such a glycidyl compound is commercially available from Exxon Chemical Company under the trademark Glydexx®.

An important phenolic ester alcohol for use in the invention has the general formula "C".

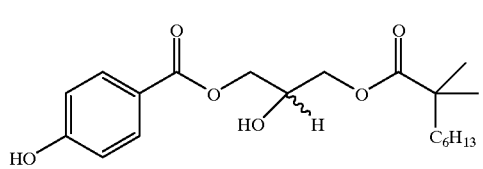

In making the polymeric vehicle, each component is in relative amounts effective for providing an acceptable coating binder which generally will have a pencil hardness of at least about HB and preferably F, an impact resistance of at least about 20-inch pounds direct, preferably 30, and at least about 20-inch pounds reverse, preferably 30, at a film thickness of about 0.5 mil dry. The crosslinker may be a solid, but generally is a liquid. The viscosity of the blend which forms the polymeric vehicle, such as the phenolic ester alcohol, isocyanate and polyol, is in the range of from about 0.1 to about 20 Pa.s at about 20 to about 60° C. at a shear rate of at least 1000 sec.$^{-1}$ without organic solvent and/or water.

Generally the polymeric vehicle may have from about 5 to about 70 weight percent, based upon the weight of the polymeric vehicle, phenolic ester alcohol, from about 5 to about 40 weight percent, based upon the weight of the polymeric vehicle, isocyanate compound and at least about 15 weight percent and preferably from about 15 to about 75 weight percent, based upon the weight of the polymeric vehicle, polyol. In the aspect of the invention which includes the amino resin, the polymeric vehicle includes from about 5 to about 55 weight percent of an amino resin. When the amino resin is present in the blend of the polymeric vehicle, the polymeric vehicle will generally comprise from about 3 to about 45 weight percent amino resin.

DESCRIPTION OF THE PREFERRED EMBODIMENTS

"Polyester" means a polymer which has —C(=O)O— linkages in the main chain of the polymer.

"Acrylic polymer" means a homo or copolymer of hydroxy substituted acrylic acid or acrylate, and/or hydroxy and alkyl substituted acrylic acid or acrylate as further described below.

"Isocyanate compound" means a compound which as isocyanate functionality or groups [—NC=O] which compound has an average isocyanate functionality of from about 1.9 to about 20 isocyanate groups per molecule which isocyanate functionality is reactive with the hydroxyls of the phenolic ester alcohol. The isocyanate compound may be a biuret, an isocyanurate and/or a blocked or unblocked isocyanate.

"Polyisocyanate" can mean compounds with two or more isocyanate groups [—NC=O] which are reactive with hydroxyl groups and which compounds may be biurets and isocyanurates.

"Biuret" means an isocyanate reacted with water in a ratio of three equivalents of isocyanate to one equivalent of water, such as the biuret of HDI shown below.

An "isocyanurate" is a six-membered ring having nitrogens at the 1, 3 and 5 positions and keto groups at the 2, 4 and 6 positions, the nitrogens being substituted with an isocyanate group, such as shown below in the isocyanurate of HDI.

"Amino resin" means amino resins usually made from amidines, ureas or amides by reaction with formaldehyde and subsequently usually with an alcohol. Melamine resins are a subclass of amino resins and may also be referred to as "melamine-formaldehyde resin" or "alcoholated melamine-formaldehyde resin." Amino resin amounts may be adjusted in amounts effective to obtain the properties desired and to control the viscosity of the polymeric vehicle which viscosity will also be a function of the molecular weights of the phenolic ester alcohol, isocyanate and polyol in the blend which form the polymeric vehicle.

"Crosslinking agent" means a compound having di- or polyfunctional isocyanate groups or a polyfunctional amino resin. The isocyanate compound or amino resin contains isocyanate or crosslinking functional groups that are capable of forming covalent bonds with hydroxyl groups that are present on the phenolic ester alcohol and/or polyol in the polymeric vehicle. The crosslinking agent may be a blend;

hence, there may be more than one substance which forms a blend of substances which form covalent bonds with the hydroxyl groups of the polyol. Amino reins and polyisocyanates are such crosslinking agents.

"Polymeric vehicle" means polymeric and resinous components in the formulated coating, i.e., before film formation, including but not limited to the phenolic ester alcohol, the polyol and additional hardeners which may be added.

"Coating binder" means the polymeric part of the film of the coating after solvent has evaporated and after crosslinking.

"Formulated coating" composition means the polymeric vehicle and optional solvents, as well as pigments, catalysts and additives which may optionally be added to impart desirable application characteristics to the formulated coating and desirable properties such as opacity and color to the film.

"Residue" means that portion of a molecule that is left after a reaction which in general eliminates some atoms from the reactant or moves the atom to different positions among the reactants. By way of an example, a urethane linkage

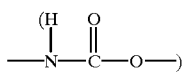

forms by way of reaction of an alcohol and isocyanate. The residue of the alcohol and isocyanate forming the urethane linkage. An amine may react with an alcohol with the loss of water. The new molecule is a residue of the alcohol and amine.

"VOC" means volatile organic compounds.

"Diol" is a compound, oligomer or polymer with two hydroxyl groups. "Polyol" is a compound, oligomer or polymer with two or more hydroxyl groups.

"Solvent" means an organic solvent.

"Organic solvent" means a liquid which includes but is not limited to carbon and hydrogen and has a boiling point in the range of from about 30° C. to about 300° C. at about one atmosphere pressure.

"Volatile organic compounds" are defined by the U.S. Environmental Protection Agency at 40 C.F.R. 51.000 of the Federal Regulations of the United States of America as any compound of carbon, excluding carbon monoxide, carbon dioxide, carbonic acid, metallic carbides or carbonates, and ammonium carbonate, which participates in atmospheric photochemical reactions.

This includes any such organic compound other than then following, which have been determined to have negligible photochemical reactivity: acetone; methane; ethane; methylene chloride (dichloromethane); 1,1,1-trichloroethane (methyl chloroform); 1,1,1-trichloro-2,2,2-trifluoroethane (CFC-113); trichlorofluoromethane (CFC-11); dichlorodifluoromethane (CFC-12); chlorodifluoromethane (CFC-22); trifluoromethane (FC-23); 1,2-dichloro-1,1,2,2-tetrafluoroethane (CFC-114); chloropentafluoroethane (CFC-115); 1,1,1-trifluoro 2,2-dichloroethane (HCFC-123); 1,1,1,2-tetrafluoroethane (HF-134a); 1,1-dichloro 1-fluoroethane (HCFC-141b); 1-chloro 1,1-difluoroethane (HCFC-142b); 2-chloro-1,1,1,2-tetrafluoroethane (HCFC-124); pentafluoroethane (HFC-125); 1,1,2,2-tetrafluoroethane (HFC-134); 1,1,1-trifluoroethane (HFC-143a); 1,1-difluoroethane (HFC-152a); and perfluorocarbon compounds which fall into these classes:

(i) Cyclic, branched, or linear, completely fluorinated alkanes;
(ii) Cyclic, branched, or linear, completely fluorinated ethers with no unsaturations;
(iii) Cyclic, branched, or linear, completely fluorinated tertiary amines with no unsaturations; and
(iv) Sulfur containing perfluorocarbons with no unsaturations and with sulfur bonds only to carbon and fluorine. Water is not a VOC.

A "film" is formed by application of the formulated coating composition to a base or substrate, evaporation of solvent, if present, and crosslinking.

The invention includes a polymeric vehicle comprising at least one phenolic ester alcohol having at least one phenolic hydroxyl group and at least one aliphatic hydroxyl group; at least one polyol; and at least one isocyanate compound having an average isocyanate functionality of from about 1.9 to about 20 isocyanate groups per molecule which isocyanate functionality is reactive with the hydroxyls of the phenolic ester alcohol and polyol. In an important aspect, the phenolic ester alcohol has about one aliphatic hydroxyl group. In the aspect of the invention, which includes the phenolic ester alcohol, isocyanate compound and polyol, each of these components in the polymeric vehicle are present in an amount effective to provide a coating binder with a hardness of at least about HB at a thickness of about 0.5 mil dry. In an important aspect of the invention which provides a high solids or solventless polymeric vehicle and/or formulated coating composition, the viscosity of the blend which constitutes the polymeric vehicle (which includes the phenolic ester alcohol, polyol and isocyanate compound) will be in the range of from about 0.1 to about 20 Pa.s at about 20 to about 60° C. at a shear rate of at least about 1,000 and preferably in the range of about 1,000 to about $1 \times 10^{-6}$ sec.$^{-1}$ in the absence of organic solvent and/or water.

The blend of the phenolic ester alcohol, polyol and isocyanate compound provides the polymeric vehicle with improved coating properties such as hardness, flexibility, hydrolytic stability, solvent resistance, corrosion resistance, weatherability, acid resistance and gloss. The polymeric vehicle and formulated coating compositions which include the polymeric vehicle of the invention may include organic solvents, water, or may not require water or organic solvents to provide a formulated coating composition with a viscosity such that the formulated coating composition may be applied by existing application equipment. When the phenolic ester alcohol, polyol and isocyanate compound are at low molecular weights, such as when the phenolic ester alcohol has a number average molecular weight in the range of from about 110 to about 1,000, the blend of the phenolic ester alcohol and isocyanate not only improves film properties, it does so while maintaining or lowering the VOCs in the polymeric vehicle and formulated coating composition. Frequently, the need is reduced for organic solvents and/or water to lower the viscosity of the polymeric vehicle or formulated coating composition to permit the application of the formulated coating composition to a substrate.

The phenolic ester alcohol and isocyanate compound may be used as a reactive diluent in conjunction with the polyol. When the phenolic ester alcohol and isocyanate compound have low molecular weights as described above, they may be used as a blend which is a reactive diluent in the polymeric vehicle which includes the polyol. Moreover, by controlling the molecular weights of the phenolic ester alcohol, isocyanate and polyol, the blend may be used as a reactive diluent which controls VOC and may be added to a polymeric vehicle to lower VOCs to levels of at least about 5 weight percent.

In high solids formulated coating compositions which include organic solvents (such as about 75 weight percent solids), one aspect of the invention contemplates the phenolic ester alcohol, isocyanate compound, amino resin, if any, and polyol being in amounts effective for maintaining VOCs in the formulated coating composition (which includes the polymeric vehicle) to less than about 3.5 pounds of VOC per gallon of formulated coating composition while at least maintaining the pencil hardness of the coating binder, to at least about HB and maintaining an impact resistance of the coating binder to at least about 20-inch pounds direct and at least about 20-inch pounds indirect at a film thickness of about 0.5 mil dry. Indeed in the high solids aspect of the invention, the invention is effective for providing formulated coating compositions having less than 2.5 pounds of VOC per gallon of formulated coating composition and in some cases less than 2.0 pounds of VOC per gallon of formulated coating composition.

In yet another important aspect, the invention is effective for providing solventless liquid formulated coating compositions (not more than about 3 weight percent organic solvent) where the polymeric vehicle in the formulated coating composition comprises the phenolic ester alcohol and isocyanate compound, each at low molecular weight, a polyol having a molecular weight of at least 200, an average hydroxyl functionality of from about 2 to about 100 hydroxyls per molecule and an amino resin.

Further the blend of the phenolic ester alcohol, polyol and isocyanate compound is compatible with and permits the use of other diphenolic hardeners to improve coating properties, but yet also permits the use of the additional hardeners in a formulated coating composition which may include solvents. By way of example, a diphenolic polyol ester reaction product of hydroquinone and parahydroxy benzoic acid (known as SK101) has low solvent dispersibility or solubility, requires high-cure temperatures and often makes coatings intractable. The use of the blend of the invention permits the use of other diphenolic hardeners such as SK101 which has the structure to improve hardness yet reduces the other problems attendant with the use of such hardeners.

The Phenolic Ester Alcohol

The phenolic ester alcohol has at least one phenolic hydroxyl group, and at least one aliphatic hydroxyl group. In an important aspect, it has two ester groups and about one aliphatic hydroxyl group. Generally, it is the reaction product of a phenol carboxylic acid and an epoxy compound. In an important aspect, the phenolic ester alcohol is represented by the general formula "A"

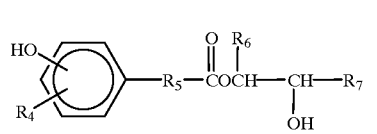

wherein $R_4$ is selected from the group consisting of hydrogen, halogen, hydroxyl, $C_1$ to $C_8$ alkyl and $C_1$ to $C_8$ alkoxy, $R_5$ is a direct bond or a $C_1$ to $C_{20}$ organic radical which may incorporate another phenol, aliphatic hydroxyl, ester, ether and/or carbonate group in its structure, $R_6$ is hydrogen or a $C_1$ to $C_{20}$ organic radical which may include an ester group, or a direct bond which may form with $R_7$ part of a 5 or 6 carbon atom cyclic ring structure, $R_7$ is $CH_2R_8$ wherein $R_8$ is selected from the group consisting of hydroxy, $OR_9$, $OOCR_{10}$ and $R_{11}$ wherein $R_9$ is a primary or secondary aliphatic group containing 3 to 20 carbon atoms which may include one or more ester linkages or an aromatic group containing 6 to 20 carbon atoms, $R_{10}$ is a primary, secondary or tertiary aliphatic group containing 4 to 20 carbon atoms which may include one or more ester linkages or an aromatic group containing 6 to 20 carbon atoms, and $R_{11}$ is a $C_2$ to $C_{20}$ organic radical which may include one or more ester linkages and where the organic radical may form with $R_6$ part of a 5 or 6 carbon atom cyclic ring structure. In a particularly important aspect $R_5$ or $R_8$ has the ester groups. The —OH expressly shown in formula A is illustrative of an aliphatic hydroxyl group. A phenolic ester alcohol which is particularly important to the invention is represented by general formula C above. As used herein, an ester group means

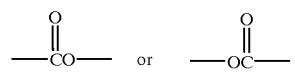

A phenol carboxylic acid reactant which may be reacted with the epoxy compound has the general formula:

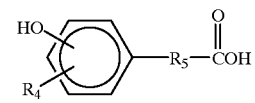

wherein $R_4$ and $R_5$ are as described above. Examples of suitable phenol carboxylic acids include hydroxybenzoic acids, acids where $R_5$ is alkylene such as phenyl acetic acid, hydroxy phenyl propionic acid, hydroxyphenyl stearic acid, and acids where in $R_5$ encompasses additional phenol functionality such as 4,4-bis hydroxyphenyl pentanoic acid and the like. In a preferred embodiment of the invention, $R_4$ in formula A is hydrogen, $R_5$ is a direct bond, $R_6$ is hydrogen and $R_7$ is $CH_2OH$, a hydrocarbon moiety or an organic moiety containing ester or ether groups and containing from 1 to about 20 carbon atoms, more preferably from about 3 to 20 carbon atoms.

In an important aspect of the invention, the phenolic ester alcohol is the ester reaction product of a hydroxybenzoic acid and an epoxy compound. Suitable hydroxybenzoic acids include ortho-hydroxybenzoic acid (salicylic acid), meta-hydroxybenzoic acid and para-hydroxybenzoic acid (PHBA), with para-hydroxybenzoic acid being most preferred.

The epoxy compound may be selected from the group consisting of glycidyl esters, glycidyl alcohols, glycidyl ethers, linear epoxies and aromatic epoxies. These include glycidol, glycidyl ethers of the structure:

glycidyl esters of the structure:

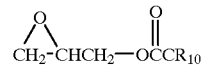

glycidyl or oxirane compounds having the structure:

and cycloaliphatic epoxy compounds having the structures:

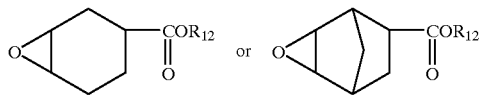

wherein $R_{12}$ is an organic radical having 1–12 carbon atoms which can include ether, ester, hydroxyl or epoxy groups.

Other epoxy materials include epoxidized alpha-olefins and bis aromatic epoxies such as the reaction product of bisphenol A or F with epichlorohydrin.

Suitable epoxy compounds particularly include monoepoxides containing a terminal glycidyl group or polyepoxides containing internal oxirane or glycidyl groups or terminal glycidyl groups. Suitable epoxy compounds include glycidyl acrylate or methacrylate monomers, alkyl glycidyl ether monomers, and low molecular weight copolymers of one or more of these monomers with one or more ethylenically unsaturated monomers such as acrylates, methacrylates, vinyl aromatic monomers and the like.

Other suitable epoxy compounds include the ester reaction products of epichlorohydrin with mono- or dibasic aliphatic or aromatic carboxylic acids or anhydrides containing from about 1 to 20 carbon atoms. Inclusive of such acids are aliphatic acids such as acetic, butyric, isobutyric, lauric, stearic, maleic and myristic acids and aromatic acids such as benzoic, phthalic, isophthalic and terephthalic acids as well as the corresponding anhydrides of such acids. Preferred such acids are primary, secondary or tertiary aliphatic carboxylic acids containing from 5 to 13 carbon atoms. As described above, a very important aspect of the invention is when the epoxy compound is the glycidyl ester of a mixed aliphatic, mostly tertiary, mono carboxylic acid with an average of 9 to 11 carbon atoms such glycidyl ester being available from Exxon Chemical Co., under the trade name GLYDEXX® or from Shell Chemical Co., under the trade name CARDURA® E ester. These may be represented by the general formula "B". (Glydexx® general formula).

Still other epoxy compounds include glycidyl ether reaction products of epichlorohydrin with aliphatic or aromatic alcohols or polyols containing from about 1 to 20 carbon atoms. Suitable alcohols include aromatic alcohols such as bisphenol, bisphenol A, bisphenol F, phenolphthalein and novolac resins; aliphatic alcohols such as ethanol, isopropanol, isobutyl alcohol, hexanol, stearyl alcohol and the like; and aliphatic polyols such as ethylene glycol, propylene glycol and butylene glycol.

Other epoxy compounds which may be used include the mono-epoxides of $C_8$ to $C_{20}$ alpha mono-olefins.

The epoxy compound may also comprise epoxidized fatty compounds. Such epoxidized fatty compounds include epoxidized fatty oils, epoxidized fatty acid esters of monohydric alcohols, epoxidized fatty acid esters of polyhydric alcohols, epoxidized fatty nitriles, epoxidized fatty amides, epoxidized fatty amines and epoxidized fatty alcohols. Suitable alicyclic epoxide and polyepoxide materials include dicyclopentadiene diepoxide, limonene diepoxide, and the like. Additional useful epoxides include for example, vinyl cyclohexane dioxide, bis (3,4-epoxycyclohexyl) adipate, 3,4-epoxycyclohexylmethyl-3,4-epoxy-cyclohexane carboxylate and 2-(3,4-epoxycyclohexyl-5,5-spiro-3,4-epoxy)cyclohexane-metadioxane.

In a very important aspect of making the phenolic ester alcohol, the hydroxybenzoic acid/epoxy reaction product may be formed by reacting the hydroxybenzoic acid and the epoxy compound to provide a phenolic ester alcohol with one aliphatic hydroxyl group, optionally in a solvent therefor, at a temperature ranging from about 90° to about 120° C. to initiate such reaction. Once the reaction, by heating, it is exothermic, and the reaction temperature can rise to a temperature of about 150° to 175° C. usually without application of external heat. The reaction temperature then is maintained at about 150° C. to 170° C. (and preferably less than about 200° C.) until the reaction has been determined to be substantially complete.

Reaction products of reduced discoloration can be produced by control of the maximum temperature of the exothermic reaction. This can be achieved by a staged and/or incremental addition of one of the reactants, e.g. the epoxy reactant, so that the reaction temperature is maintained at a temperature of about 150° C. or below. The remainder of that reactant may then be added in stages or continuously while maintaining the reaction temperature below about 150° C. This process modification gives rise to reaction products having lower Color Index values.

Approximately stoichiometric quantities of the epoxy compound and the phenol carboxylic acid are used in the reaction, although a slight molar excess of epoxy may be necessary to drive the reaction to completion.

The Isocyanate Compound

Diisocyanates which may be used as isocyanate compounds in the invention additional to HDI include isophorone diisocyanate (IPDI), tetramethylxylene diisocyanate (TMXDI), and other aliphatic diisocyanates such as trimethylene diisocyanate, tetramethylene diisocyanate, pentamethylene diisocyanate, 1,2-propylene diisocyanate, 2,3-butylene diisocyanate, 1,3-butylene diisocyanate, 2,4,4- or 2,2,4-trimethylhexamethylene diisocyanate; cycloalkylene diisocyanates such as 1,3-cyclopentane-diisocyanate, 1,4-cyclohexane-diisocyanate and 1,3-cyclohexane-diisocyanate; and aromatic diisocyanates such as m-phenylene diisocyanate, p-phenylene diisocyanate, 4,4'-diphenyldiisocyanate, 1,5-naphthalene diisocyanate, 4,4'-diphenylmethane diisocyanate, 2,4- or 2,6-toluene diisocyanate.

The isocyanate compound may have blocked isocyanate groups. Agents which block the isocyanate groups and "deblock" at elevated temperature are known and are used in the invention. These include oxines, lactams, imines, carbamates such as acetone oxime, methyl ethyl ketoxime, and ε-caprolactam.

The polyisocyanates may be dimerized or trimerized diisocyanates such as trimerized HDI or IPDI and triisocyanates such as triphenylmethane-4,4',4"-triisocyanate, 1,3,5-triisocyanatobenzene, 1,3,5-triisocyanatocyclohexane, 2,4,6-triisocyanatotoluene and ω-isocyanatoethyl-2,6-diisocyanatocaproate; and tetraisocyanates, such as 4,4'-diphenyldimethylmethane-2,2',5,5'-tetraisocyanate.

They also may be polymers or copolymers with vinyl monomers of isocyanate functional monomers such as

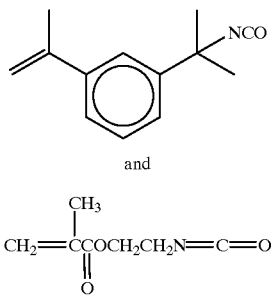

and

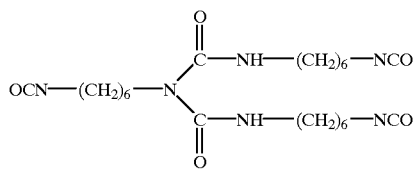

In another aspect of the invention, unblocked or blocked biurets such as the biuret of hexamethylene diisocyanate (HDI) which biuret has the structure

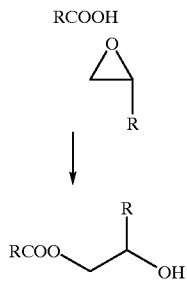

and is a trimerized product of hexamethylene diisocyanate and water may be used as polyisocyanates.

In a particularly important aspect of the invention, the polymeric vehicle comprises an isocyanate, biuret, isocyanurate or blends thereof with an —NC═O functionality of about 3, a phenolic ester alcohol shown in formula C above and a polyester polyol.

The Polyols In The Polymeric Vehicle

The polyols which are used in the invention are selected from the group consisting of polyesters, alkyd polymers, acrylic polymers and epoxy polymers. The polyols have a PDI of greater than one and an number average molecular weight ($M_n$) of at least about 200, and may generally range from about 200 up to about 30,000, more preferably from about 280 up to about 15,000, and most preferably from about 300 up to about 3,000 to 6,000. Glass transition temperatures (Tg) of these materials may generally range from as low as −90° C. up to +100° C. or higher.

The diester and polyester polyols may be prepared by well known condensation processes using a molar excess of diol. Preferably the molar ratio of diol to dicarboxylic acid is p+1:p wherein p represents the number of moles of dicarboxylic acid. The reaction may be conducted in the absence of or presence of a suitable polycondensation catalyst as is known in the art. Polyesters also can be made from carboxylic acids and oxiranes, such as

RCOOH $$\text{RCOOH} + \overset{R}{\underset{}{\triangle}} \longrightarrow RCOO\text{—CH}_2\text{—CH(R)—OH}$$

R═H, alkyl, aryl

Some preferred examples of the diols used to make the polyester polyols are one or more of the following: neopentyl glycol; ethylene glycol; hexamethylenediol; 1,2-cyclohexanedimethanol; 1,3-cyclohexanedimethanol; 1,4-cyclohexanedimethanol; diethylene glycol; triethylene glycol; tetraethylene glycol; dipropylene glycol; polypropylene glycol; hexylene glycol; 2-methyl-2-ethyl-1,3-propanediol; 2-ethyl-1,3-hexandediol; 1,5-pentanediol; thiodiglycol; 1,3-propanediol; 1,2-propanediol; 1,2-butanediol; 1,3-butanediol; 2,3-butanediol; 1,4-butanediol; 2,2,4-trimethyl-1,3-pentanediol; 1,2-cyclohexanediol; 1,3-cyclohexanediol; 1,4-cyclohexanediol; neopentyl diol hydroxy methyl isobutyrate, and mixtures thereof. Examples of polyols include triols such as glycerine, timethylol ethane, trimethylol propane, pentaerythritol and the like.

The diols are reacted with carboxyl groups to make the polyesters. The carboxyl groups may be present in the form of anhydride groups, lactone groups, or equivalent ester forming derivatives such as the acid halide or methyl ester. The dicarboxylic acids or derivatives are preferably one or more of the following: phthalic anhydride, terephthalic acid, isophthalic acid, naphthalene dicarboxylic acids, adipic acid, succinic acid, glutaric acid, fumaric acid, maleic acid, cyclohexane dicarboxylic acid, azelaic acid, sebasic acid, dimer acid, caprolactone, propiolactone, pyromellitic dianhydride, substituted maleic and fumaric acids such as citraconic, chloromaleic, mesaconic, and substituted succinic acids such as aconitic and itaconic, and mixtures thereof. Many commercially available polyesters are produced using a combination of aromatic and aliphatic dicarboxylic acids or a combination of cycloaliphatic and aliphatic dicarboxylic acids or combinations of all three types. However, where polyesters having low viscosity and low solvent content are desired, the most preferred acids used for the purposes of this invention are linear saturated or unsaturated aliphatic dicarboxylic acids having from 2 to 10 carbon atoms such as succinic, glutaric, adipic, and similar materials.

The acrylic polymers which may be used as the polyol component in the present invention are acrylic copolymer resins. The acrylic copolymer resin is prepared from at least one hydroxy-substituted alkyl (meth) acrylate and at least one non-hydroxy-substituted alkyl (meth) acrylate. The hydroxy-substituted alkyl (meth) acrylates which can be employed as monomers comprise members selected from the group consisting of the following esters of acrylic or methacrylic acid and aliphatic glycols: 2-hydroxyethyl acrylate, 3-chloro-2-hydroxypropyl acrylate; 1-hydroxy-2-acryloxy propane; 2-hydroxypropyl acrylate; 3-hydroxypropylacrylate; 2,3-dihydroxypropylacrylate; 3-hydroxybutyl acrylate; 2-hydroxybutyl acrylate; 4-hydroxybutyl acrylate; diethyleneglycol acrylate; 5-hydroxypentyl acrylate; 6-hydroxyhexyl acrylate; triethyleneglycol acrylate; 7-hydroxyheptyl acrylate; 1-hydroxy-2-methacryloxy propane; 2-hydroxypropyl methacrylate; 2,2-dihydroxypropyl methacrylate; 2-hydroxybutyl methacrylate; 3-hydroxybutyl methacrylate; 2-hydroxyethyl methacrylate; 4-hydroxybutylmeth-acrylate; 3,4-dihydroxybutyl methacrylate; 5-hydroxy-pentyl methacrylate; and 7-hydroxyheptyl methacrylate. The preferred hydroxy functional monomers for use in preparing the acrylic resins are hydroxy-substituted alkyl (meth) acrylates having a total of 5 to 7 carbon atoms, i.e., esters of $C_2$ to $C_3$ dihydric alcohols and acrylic or methacrylic acids. Illustrative of particularly suitable hydroxy-substituted alkyl (meth) acrylate monomers are 2-hydroxyethyl methacrylate, 2-hydroxyethyl acrylate, 2-hydroxybutyl acrylate, 2-hydroxypropyl methacrylate, and 2-hydroxypropyl acrylate.

Among the non-hydroxy-substituted alkyl (meth) acrylate monomers which may be employed are alkyl (meth) acrylates. Preferred nonhydroxy unsaturated monomers are esters of $C_1$ to $C_{12}$ monohydric alcohols and acrylic or methacrylic acids, e.g., methyl methacrylate, hexyl acrylate, 2-ethylhexyl acrylate, lauryl methacrylate, glycidyl methacrylate, etc. Examples of particularly suitable monomers are butyl acrylate, butyl methacrylate and methyl methacrylate.

Additionally, the acrylic copolymer polyol resins used in the present invention may include in their composition other monomers such as acrylic acid and methacrylic acid, monovinyl aromatic hydrocarbons containing from 8 to 12 carbon atoms (including styrene, alpha-methyl styrene, vinyl toluene, t-butyl styrene, chlorostyrene and the like), vinyl chloride, vinylidene chloride, acrylonitrile, epoxy-modified acrylics and methacrylonitrile.

The acrylic copolymer polyol preferably has a number average molecular weight not greater than 30,000, more preferably between about 280 and 15,000, and most preferably between about 300 and 5000.

Alkyd polymers may be used as the polyol component of this invention. These alkyd resins usually have a number average molecular weight in the range of from about 500 to about 20,000, are oil modified polyester resins and are broadly the product of the reaction of a dihydric alcohol and a dicarboxylic acid or acid derivative and an oil, fat or carboxylic acid derived from such oil or fat which acts as a modifier. Such modifiers are drying oils, semi-drying oils or non-drying oils. The polyhydric alcohol employed is suitably an aliphatic alcohol, and mixtures of the alcohols also may be employed. The dicarboxylic acid, or corresponding anhydrides, may be selected from a variety of aliphatic carboxylic acids or mixtures of aliphatic and aromatic dicarboxylic acids. Suitable acids and acid anhydrides include, by way of example, succinic acid, adipic acid, phthalic anhydride, isophthalic acid, trimellitic acid (anhydride) and bis 3,3', 4,4'-benzophenone tetracarboxylic anhydride. Mixtures of these acids and anhydrides may be employed to produce a balance of properties. As the drying oil or fatty acid there is suitably employed a saturated or unsaturated fatty acid of 12 to 22 carbon atoms or a corresponding triglyceride, that is, a corresponding fat or oil, such as those contained in animal or vegetable fats or oils. Suitable fats and oils include tall oil, castor oil, coconut oil, lard, linseed oil, palm oil, peanut oil, rapeseed oil, soybean oil and beef tallow. Such fats and oils comprise mixed triglycerides of such fatty acids as caprylic, capric, lauric, myristic, palmitic, and stearic and such unsaturated fatty acids as oleic, eracic, ricinoleic, linoleic and linolenic. Chemically, these fats and oils are usually mixtures of two or more members of the class. Alkyd resins made with saturated monocarboxylic acids and fats are preferable where improved weather resistance is of prime concern.

Epoxy polymers having a number average molecular weight in the range of from about 500 to about 6,000 may be used as the polyol component of this invention.

A well-known epoxy resin which may be used in the invention is made by condensing epichlorohydrin with bisphenol A, diphenylol propane. An excess of epichlorohydrin is used, to leave epoxy groups on each end of the low-molecular weight polymer:

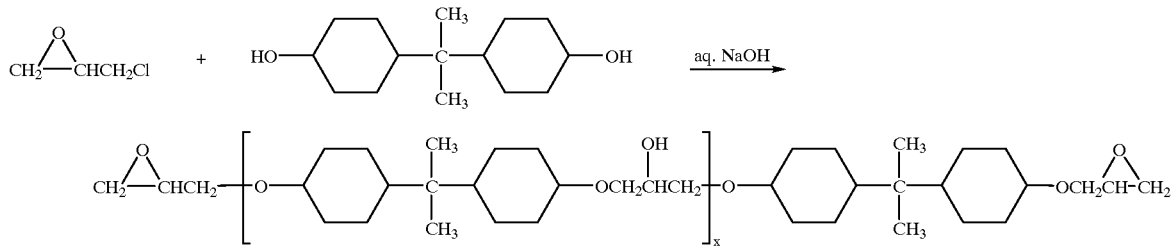

The viscosity of the polymer is a function of molecular weight, the higher the molecular weight the more viscous the polymer.

Other hydroxyl-containing compounds, including resorcinol, hydroquinone, glycols, and glycerol may be used in lieu of bisphenol A.

The Amino Resins

Methylol (alkoxymethyl) amino crosslinking agents are suitable for use in the present invention and are well known commercial products, and are generally made by the reaction of di (poly) amide (amine) compounds with formaldehyde and, optionally, a lower alcohol. The amino resins have from about 3 to about 30 crosslinking groups per molecule.

Examples of suitable amino-crosslinking resins include one or a mixture of the following materials.

(a) Melamine based resins

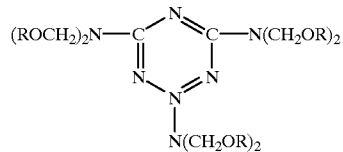

wherein R is the following:

R=$CH_3$ (Cymel® 300, 301, 303);

R=$CH_3$, $C_2H_5$ (Cymel® 1116);

R=$CH_3$, $C_4H_9$ (Cymel® 1130, 1133);

R=$C_4H_9$ (Cymel® 1156); or

R=$CH_3$, H (Cymel® 370, 373, 380, 385).

The preferred melamine is hexamethoxymethyl melamine.

(b) Benzoquanamine based resins

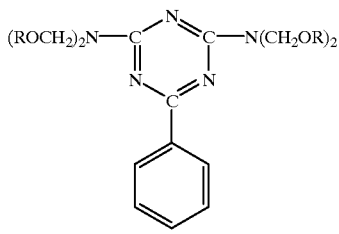

wherein R=CH$_3$, C$_2$H$_5$ (Cymel® 1123).

(c) Urea based resins

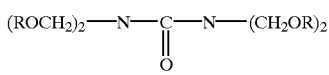

wherein:
R=CH$_3$, H (Beetle™ 60, Beetle™ 65); or
R=C$_4$H$_9$ (Beetle™ 80).

(d) Gycoluryl based resins

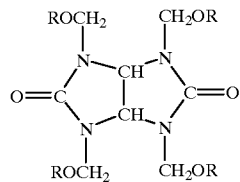

wherein:
R=CH$_3$, C$_2$H$_5$ (Cymel® 1171); or
R=C$_4$H$_9$ (Cymel® 1170).

The amino resin may be a liquid or solid. In the aspect the invention where VOCs are being minimized, if the amino resin is a solid, that solid is soluble in such blend of the polymeric vehicle and the viscosity of the formulated coating composition and polymeric vehicle should not exceed the ranges described herein. When the amino resin is a liquid, it preferably has a viscosity of less than about 3.0 Pa.s at about 25° C. A highly alkylated hexamethoxymethylmelamine (HMMM) resin with the following general formula is a very suitable crosslinker:

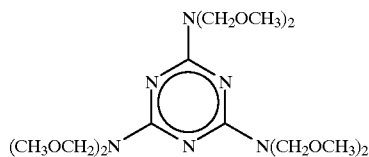

The latter HMMM resin appears to be a waxy solid under most conditions with a melting point in the range of about 30° C. and is sold by Cytec Chemical Company under the name Cymel 300. A similar crosslinker which is a melamine resin which can be used in the invention is a highly monomeric, highly methylolated hexamethylolated melamine formaldehyde resin which appears to be a solid under most conditions at 25° C. and is sold by Monsanto Chemical Company under the designation HM-2612.

Solvents And Optional Ingredients In the Polymeric Vehicle

There are different aspects of the invention which include a polymeric vehicle effective for providing a formulated coating composition which is without any added organic solvent or at least does not have more than about 3 weight percent organic solvent, a polymeric vehicle which is effective for providing a high solids, low VOC formulated coating composition and a water-thinned formulated coating composition. Suitable optional solvents which may be included in the curable compositions of the invention comprise toluene, xylene, ethylbenzene, tetralin, naphthalene, and solvents which are narrow cut aromatic solvents comprising C$_8$ to C$_{13}$ aromatics such as those marketed by Exxon Chemical Company under the name Aromatic 100, Aromatic 150, and Aromatic 200.

Other suitable solvents include acetone, methyl ethyl ketone, methyl isobutyl ketone, methyl amyl ketone, methyl isoamyl ketone, methyl heptyl ketone, isophorone, isopropanol, n-butanol, sec.-butanol, isobutanol, amyl alcohol, isoamyl alcohol, hexanols, and heptanols.

Additional suitable oxygenated solvents include propylene glycol monomethyl ether acetate, propylene glycol propyl ether acetate, ethyl ethoxypropionate, dipropylene glycol monomethyl ether acetate, propylene glycol monomethyl ether, and like materials. Other such solvents include alkyl esters such as ethyl acetate, n-propyl acetate, butyl acetate, amyl acetate, mixtures of hexyl acetates such as sold by Exxon Chemical Company under the name EXXATE® 600 and mixtures of heptyl acetates sold under the name EXXATE® 700. The list should not be considered as limiting, but rather as examples of solvents which are useful in the present invention. The type and concentration of solvents are generally selected to obtain formulation viscosities and evaporation rates suitable for the application and baking of the coatings.

Suitable pigments which may be included in the compositions of this invention are those opacifying pigments normally used in paint and coating formulations and include titanium dioxide, zirconium oxide, zircon, zinc oxide, iron oxides, antimony oxide, carbon black, as well as chrome yellows, greens, oranges, mixed metal oxides, ceramic pigments and the like. Preferred pigments include rutile TiO$_2$ and particularly weather-resistant coated types of TiO$_2$. The pigments may also be blended with a suitable extender material which does not contribute significantly to hiding power. Suitable extenders include silica, barytes, calcium sulfate, magnesium silicate (talc), aluminum oxide, aluminum hydroxide, aluminum silicate, calcium silicate, calcium carbonate (mica), potassium aluminum silicate and other clays or clay-like materials.

Satisfactory baking schedules such as 38° C. to 150° C. for formulations of the present invention vary widely including, but not limited to, low temperature bakes of about 20 to 30 minutes at temperatures between 90° C. and 105° C. for large equipment applications and high temperature bakes of about 5 to 10 seconds in 300° C. to 375° C. air for coil coating applications. In an important aspect, the polymeric vehicles may be cured at about 25° C. when the crosslinker is an isocyanate and the melamine is not relied upon to crosslink. In general, the substrate and coating should be baked at a sufficiently high temperature for a sufficiently long time so that essentially all solvents are evaporated from the film and chemical reactions between the polymer and the crosslinking agent proceed to the desired degree of completion. The desired degree of completion also varies widely and depends on the particular combination of cured film properties required for a given application. Further, catalyzed crosslinking also may be effected at ambient temperatures using many isocyanate-type crosslinkers.

Acid catalysts may be used to cure systems containing hexamethoxymethyl melamine and other amino crosslinking agents, and a variety of suitable acid catalysts are known to one skilled in the art for this purpose. These include, for example, p-toluene sulfonic acid, methane sulfonic acid, nonylbenzene sulfonic acid, dinonylnapthalene disulfonic acid, dodecylbenzene sulfonic acid, phosphoric acid, phosphorous acid, phenyl acid phosphate, butyl phosphate, butyl maleate, and the like or a compatible mixture of them. These acid catalysts may be used in their neat, unblocked form or combined with suitable blocking agents such as amines. Typical examples of unblocked catalysts are the King Industries, Inc., products with the tradename K-CURE®. Examples of blocked catalysts are the King Industries, Inc., products with the tradename NACURE®.

Catalysts for isocyanates include soluble tin salts such as dibutyltin dilaurate and dibutyltin diacetate, divalent zinc salts such as zinc diacetate, and tertiary bases including tertiary amines, such as diazabicyclooctane.

The amount of catalyst employed typically varies inversely with the severity of the baking schedule. In particular, smaller concentrations of catalysts are usually required for higher baking temperatures or longer baking times. Typical catalyst concentrations for moderate baking conditions (15 to 30 minutes at 150° C.) would be about 0.01 to 0.2 wt % catalyst solids per polymer plus crosslinking agent solids. Higher concentrations of catalyst up to about 5 wt % may be employed for cures at lower temperature or shorter times. Formulations containing sufficient residual esterification catalyst, such as phosphorous acid, may not require the inclusion of any additional crosslinking catalyst to effect a proper cure at lower curing temperatures.

The following examples set forth compositions according to the invention and how to practice the invention.

EXAMPLE I

Synthesis of the Phenolic Ester Alcohol from a Glycidyl Ester and PHBA

Into a 1 liter flask equipped with agitation, nitrogen, heating and temperature probe, 326.6 g Glydexx® N-10 glycidyl ester and 173.4 g parahydroxy benzoic (PHBA) were charged. The mixture was heated at 110° C. At that point, an exothermic reaction takes place. The maximum temperature reached was 160° C. The solution was then cooled and discharged. Physical properties are given below.

Acid Number: 0 mg KOH/gram

NVM: >99%

Color: <3 Gardner

EXAMPLE II a. Ingredients

BYK®301 & 302-Flow control agent from Byk-Chemie.

Desmodur N3300-From Miles Corporation is a cyclo-trimer of 1,6-hexamethylene diisocyanate (isocyanurate of 1,6-hexamethylene diisocyanate, HDI). Its viscosity is 1.8–4 mPa.s at 25° C., and its equivalent weight is 194.

DNNDSA-Catalyst Dinonyl naphthalene disulfonic acid in isobutanol is obtained from King Industries ("Nacure-155").

Cymel 300-An HMMM resin sold by Cytec Chemical Company having the formula:

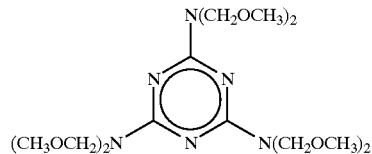

The latter HMMM resin appears to be a waxy solid under most conditions with a melting point in the range of about 30° C.

DBTL-Dibutyltin dilaurate catalyst b. Coatings

An oligoester diol was made from 1,4-butanediol and a 50/50 (mol/mol) mixture of dimethyl glutarate and dimethyl adipate. The following formulations using the latter oligoesterdiol (Mn 329), hardener, a phenolic ester alcohol as described in Example I (PHEA), the isocyanate Desmodur N3300 and melamine-formaldehyde resin, Cymel 300 were prepared in order to prepare formulations that have little or no sagging. The aliphatic-OH groups of the PHEA appear to react with the isocyanate groups at ambient or mildly elevated temperatures in the presence of the tin catalyst DBTDL, whereas the phenolic —OH group of the PHEA will condense with Cymel 300, i.e., the melamine resin at higher temperatures.

The PHEA was dissolved in the oligoesterdiol followed by Cymel 300 at room temperature. To this solution, DNNDSA, melamine catalyst, and BYK-302 were added and the formulation was uniformly mixed. After this, Desmodur N3300 was added and mixed the formulation uniformly. Finally, a solution of dibutyltin dilaurate (DBTDL) in oligoesterdiol (9.07 wt. %) was added. Low amounts of DBTDL catalyst was added to allow the urethane formulation at slow enough rate for the coating applications. The acid catalyst DNNDSA allows the phenol to condense with the melamine resin.

These formulations were coated on phosphated steel panels using drawdown bar #26 and the coated panels were baked at the specified temperature. In Table 1, the effect of varying amounts of the tin catalyst towards formulation was studied.

TABLE 1

| Experiment | I | II | III | IV | V |
|---|---|---|---|---|---|
| Oligoesterdiol (Mn 329) | 1.02 g | 1.01 g | 1.02 g | 1.00 g | 1.05 g |
| PHEA | 1.05 g | 1.01 g | 1.03 g | 1.04 g | 1.06 g |
| Desmodur N3300 | 2.02 g | 1.72 g | 1.73 g | 1.74 g | 1.73 g |
| Cymel 300 | 0.37 g | 0.37 g | 0.40 g | 0.38 g | 0.38 g |
| DBTDL soln. | 0.2 g | 0.01 g | 0.02 g | 0.08 g | 0.02 g |
| DNNDSA | 0.01 g | 0.01 g | 0.01 g | 0.01 g | 0.03 g |
| BYK-302 | 0.03 g | 0.02 g | 0.02 g | 0.02 g | 0.02 g |
| Baking Conditions | Formulation gelled right away | 300° F./ 30 min. | 300° F./ 30 min. | Formulation gelled right away | 300° F./ 30 min. |
| Appearance of the panels | — | Clear, less uniform | Clear, less uniform | — | Clear, less uniform |
| NVW (300° F., 1h, %) | — | 95.96 | 95.74 | — | 96.11 |
| Adhesion | — | 5B | 5B | — | 5B |
| Pencil | — | F | F–H | — | F–H |

TABLE 1-continued

| Experiment | I | II | III | IV | V |
|---|---|---|---|---|---|
| Impact Resist. Direct (lb/in) | — | 160 | 160 | — | 160 |
| Impact Resist. Reverse (lb-in) | — | 160 | 160 | — | 160 |
| MEK dbl. rub Resistance | — | 200 | 200 | — | 200 |

Desmodur N3300 was used to completely react with the aliphatic —OH groups of the diol and also that of PHEA. The amount of Cymel 300 used is 2× the phenol —OH equivalent.

Two sets of panels were baked for each formulation: one with the panels upright to study the effect of sagging and the other horizontal for comparison.

The data in Table 1 suggest a DBTDL catalyst solution concentration of ~0.02 wt. % or less gives sufficient time for coating panels.

The thicknesses of these panels were measured at the top, middle and bottom at the left, center and right sides of the panels to determine whether any sagging has occurred. The data are listed in Tables 2 and 3.

TABLE 2

Thickness of Films (mil) for Panels Baked Vertically

| | Experiment | | | | | | | | |
|---|---|---|---|---|---|---|---|---|---|
| | II | | | III | | | IV | | |
| | L | M | R | L | M | R | L | M | R |
| Top | 1.0 | 1.4 | 1.0 | 1.0 | 1.0 | 0.8 | 1.3 | 1.0 | 1.1 |
| Middle | 1.2 | 1.0 | 0.9 | 1.2 | 0.6 | 1.0 | 1.2 | 1.0 | 1.0 |
| Bottom | 0.8 | 1.1 | 1.4 | 1.2 | 0.9 | 1.2 | 1.1 | 0.7 | 0.8 |

L = Left; M = Middle; R = Right

TABLE 3

Thickness of Films (mil) for Panels Baked Horizontally

| | Experiment | | | | | | | | |
|---|---|---|---|---|---|---|---|---|---|
| | II | | | III | | | IV | | |
| | L | M | R | L | M | R | L | M | R |
| Top | 0.8 | 1.2 | 1.2 | 1.2 | 1.0 | 1.1 | 1.0 | 2.1 | 3.0 |
| Middle | 1.0 | 1.0 | 0.9 | 1.2 | 0.8 | 1.0 | 1.3 | 1.6 | 1.9 |
| Bottom | 1.1 | 1.2 | 1.2 | 0.8 | 0.6 | 1.2 | 0.8 | 1.3 | 1.8 |

The film thickness data suggests that little or no sagging has occurred.

c. Acetone Thinned Coating Compositions

The formulations of II-b were quite viscous for coating applications. In the following formulations, acetone was added to decrease the viscosity of the formulations and thereby improve the flow characteristics.

PHEA was dissolved in the oligoesterdiol followed by Cymel 300 at room temperature. To this solution, DNNDSA, BYK-302 and acetone were added and the formulation was uniformly mixed. After this, Desmodur N3300 was added and mixed the formulation uniformly. Finally, a solution of dibutyltin dilaurate (DBTDL) in oligoesterdiol RS93 (9.07 wt. %) was added. The acid catalyst DNNDSA allows the phenol to condense with the melamine resin.

These formulations were coated on phosphated steel panels using drawdown bar #26 and the coated panels were baked at the specified temperature. In Table 4, varying amounts of the acetone was added in the formulations.

| | Experiment | | | | |
|---|---|---|---|---|---|
| | VI | VII | VIII | IX | X |
| Oligoesterdiol (Mn 329) | 1.02 g | 1.03 g | 1.03 g | 1.03 g | 1.02 g |
| PHEA | 1.03 g | 1.03 g | 1.03 g | 1.03 g | 1.02 g |
| Desmodur N3300 | 1.74 g | 1.72 g | 1.75 g | 1.76 g | 1.78 g |
| Cymel 300 | 0.37 g | 0.38 g | 0.40 g | 0.36 g | 0.38 g |
| DBTDL soln. | 0.02 g | 0.01 g | 0.02 g | 0.01 g | 0.02 g |
| DNNDSA | 0.01 g | 0.01 g | 0.01 g | 0.01 g | 0.01 g |
| BYK-302 | 0.02 g | 0.01 g | 0.01 g | 0.01 g | 0.05 g |
| Acetone | 0.21 g (4.75 wt. %) | 0.42 g (9.13 wt. %) | 0.30 (6.58 wt. %) | 0.50 g (10.64 wt. %) | 0.21 (4.66 wt. %) |
| Baking Conditions † | 300° F./ 30 min. | 300° F./ 30 min. | 300° F./ 30 min. | 300° F./ 30 min. | 300° F./ 30 min. |
| Appearance of the panels | Clear, less uniform | Clear, less uniform | Clear, less uniform | Clear, less uniform | Clear, less uniform |
| NVW ‡ (300° F., 1 h, %) | 95.93 | 98.40 | 97.31 | 99.9 | 99.31 |
| Adhesion | 5B | 5B | 5B | 5B | 5B |
| Pencil | F | F | F | F | F |
| Impact Resist. Direct (lb/in) | 160 | 160 | 160 | 160 | 160 |
| Impact Resist. Reverse (lb-in) | 160 | 160 | 160 | 160 | 160 |
| MEK dbl. rub Resistance | >200 | >200 | >200 | >200 | >200 |

Desmodur N3300 was taken to completely react with the aliphatic —OH groups of the diol and also that of PHEA. The amount of Cymel 300 taken is 2× the phenol —OH equivalent.

† Two sets of panels were baked for each formulation: one with the panels upright to study the effect of sagging and the other horizontal for comparison.

‡ The NVW was calculated without considering the acetone content. Some acetone might have already evaporated during the formulation thereby causing higher NVW values.

The thicknesses of these panels were measured at the top, middle and bottom at the left, center and right sides of the panels to determine whether any sagging has occurred. The data is listed in Tables 5 and 6.

TABLE 5

Thickness of Films (mil) for Baked Vertically

| | Experiment | | | | | | | | |
|---|---|---|---|---|---|---|---|---|---|
| | VI | | | VII | | | VIII | | |
| | L | M | R | L | M | R | L | M | R |
| Top | 0.6 | 1.2 | 1.4 | 0.9 | 1.0 | 1.0 | 0.9 | 1.1 | 1.0 |
| Middle | 0.6 | 1.0 | 1.2 | 0.8 | 0.9 | 1.1 | 0.6 | 1.1 | 1.1 |
| Bottom | 0.8 | 1.2 | 1.1 | 0.5 | 0.9 | 1.2 | 0.5 | 0.9 | 1.2 |

| | Experiment | | | | | |
|---|---|---|---|---|---|---|
| | IX | | | X | | |
| | L | M | R | L | M | R |
| Top | 0.6 | 1.2 | 1.0 | 1.0 | 1.0 | 0.6 |
| Middle | 0.6 | 1.0 | 0.8 | 1.0 | 1.0 | 0.6 |
| Bottom | 0.7 | 1.2 | 1.6 | 1.8 | 1.1 | 0.6 |

TABLE 6

Thickness of Films (mil) for Panels Baked Horizontally

| | Experiment | | | | | | | | |
|---|---|---|---|---|---|---|---|---|---|
| | VI | | | VII | | | VIII | | |
| | L | M | R | L | M | R | L | M | R |
| Top | 1.0 | 1.0 | 1.0 | 1.0 | 1.0 | 1.1 | 1.0 | 1.1 | 1.2 |
| Middle | 1.0 | 0.8 | 1.0 | 1.0 | 1.1 | 1.1 | 0.9 | 1.1 | 1.0 |
| Bottom | 0.7 | 1.0 | 1.2 | 1.2 | 1.2 | 0.9 | 1.0 | 1.0 | 1.2 |

| | Experiment | | | | | |
|---|---|---|---|---|---|---|
| | IX | | | X | | |
| | L | M | R | L | M | R |
| Top | 0.6 | 1.4 | 1.2 | 0.6 | 0.7 | 1.1 |
| Middle | 0.7 | 0.8 | 1.2 | 0.6 | 1.1 | 1.1 |
| Bottom | 0.8 | 1.4 | 1.0 | 1.1 | 1.0 | 1.1 |

The flow pattern of these formulations were similar to the previous set of experiments (I-V) suggesting that some acetone might have evaporated during the formulation and coating process.

The viscosity of the formulation VI (with 4.75% acetone) was studied and the results are shown below.

TABLE 7

Formulation Data

| Oligoesterdiol (Mn 329) | 3.05 g |
|---|---|
| PHEA | 3.01 g |
| Desmodur N3300 | 5.13 g |
| Cymel 300 | 1.11 g |
| Acetone | 0.63 g |

This formulation had limited stability at 25° C. even without the catalysts and therefore no catalysts were added. The viscosity vs. Time data is listed in Table 8.

TABLE 8

Viscosity vs. Time Data, 25° C.

| Time (min) | Viscosity (mPa·s) | Time (min) | Viscosity (mPa·s) |
|---|---|---|---|
| 2 | 875 | 26 | 1285 |
| 4 | 890 | 28 | 1325 |
| 6 | 908 | 30 | 1375 |
| 7 | 920 | 32 | 1420 |
| 8 | 935 | 34 | 1455 |
| 9 | 950 | 36 | 1510 |
| 10 | 970 | 38 | 1545 |
| 11 | 990 | 40 | 1600 |
| 12 | 1010 | 44 | 1685 |
| 13 | 1030 | 46 | 1730 |
| 14 | 1040 | 47 | 1765 |
| 15 | 1060 | 48 | 1790 |
| 16 | 1075 | 50 | 1825 |
| 17 | 1090 | 52 | 1870 |
| 18 | 1110 | 54 | 1915 |
| 19 | 1135 | 56 | 1965 |
| 20 | 1160 | 58 | 2010 |
| 22 | 1195 | 60 | 2080 |
| 24 | 1250 | 62 | 2115 |

These data indicate a pot life of about 50 minutes for this coating composition using the criterion that the pot life is the time in which viscosity will double.

What is claimed is:

1. A polymeric vehicle comprising:
   at least about 5 weight percent, based upon the weight of the polymeric vehicle, of an isocyanate compound having an average isocyanate functionality of from about 1.9 to about 20 isocyanate groups per molecule;
   at least about 15 weight percent, based upon the weight of the polymeric vehicle, of a polyol having a polydispersity index greater than one; and
   at least about 5 weight percent, based upon the weight of the polymeric vehicle, of a phenolic ester alcohol having at least one phenolic hydroxyl group and at least one aliphatic hydroxyl group,
   the isocyanate compound being reactive with the phenolic ester alcohol and polyol.

2. The polymeric vehicle as recited in claim 1, wherein the phenolic ester alcohol has at least two ester groups and has the general formula

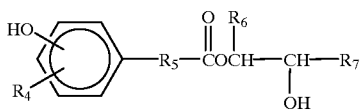

wherein $R_4$ is selected from the group consisting of hydrogen, halogen, hydroxyl, $C_1$ to $C_8$ alkyl and $C_1$ to $C_8$ alkoxy, $R_5$ is selected from the group consisting of a direct bond, $C_1$ to $C_{20}$ organic radical having only carbon and hydrogen atoms, and a $C_1$ to $C_{20}$ organic radical which includes in its structure a substitution group selected from the group consisting of phenol, aliphatic hydroxyl, ester, ether, carbonate and combinations thereof, wherein $R_6$ is selected from the group consisting of hydrogen, a $C_1$ to $C_{20}$ organic radical, a $C_1$ to $C_{20}$ organic radical which includes in its structure at least one ester linkage or a direct bond which forms with $R_7$ part of a 5 or 6 carbon atom cyclic ring structure, wherein $R_7$ is $CH_2R_8$ wherein $R_8$ is selected from the group consisting of hydroxy, $OR_9$,

and $R_{11}$, wherein $R_9$ is selected from the group consisting of a primary or secondary aliphatic group containing 3 to 20 carbon atoms, an aromatic group containing 6 to 20 carbon atoms, a primary aliphatic group containing 3 to 20 carbon atoms which includes at least one ester linkage and a secondary aliphatic group containing 3 to 20 carbon atoms which includes at least one ester linkage, wherein $R_{10}$ is selected from the group consisting of a primary aliphatic group containing 4 to 20 carbon atoms, a secondary aliphatic group containing 4 to 20 carbon atoms, a tertiary aliphatic group containing 4 to 20 carbon atoms, an aromatic group containing 6 to 20 carbon atoms, and combinations thereof, wherein the primary, secondary and tertiary aliphatic groups include at least one ester linkage; and wherein $R_{11}$ is selected from the group consisting of a $C_2$ to $C_{20}$ organic radical, a $C_2$ to $C_{20}$ organic radical which includes in its structure at least one ester linkage, a $C_2$ to $C_{20}$ organic radical which forms with $R_6$ part of a 5 or 6 carbon atom cyclic ring structure, and combinations thereof.

3. A polymeric vehicle as recited in claim 2, wherein $R_5$ includes an ester group.

4. A polymeric vehicle as recited in claims 2 or 3 wherein $R_8$ includes an ester group.

5. The polymeric vehicle as recited in claims 1 or 2, wherein the phenolic ester alcohol has a molecular weight in the range of from about 110 to about 1000 and is the reaction product of a hydroxybenzoic acid and a monoglycidyl compound having a terminal glycidyl group.

6. The polymeric vehicle as recited in claim 5 wherein the hydroxybenzoic acid is parahydroxybenzoic acid and the monoglycidyl compound has the formula

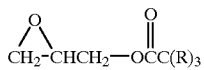

where R represents a mixture of aliphatic groups, the three R groups having a total of 8 carbon atoms.

7. The polymeric vehicle as recited in claim 2 wherein the polymeric vehicle comprises from about 5 to about 40 weight percent isocyanate compound, based on the weight of the polymeric vehicle, from about 15 to about 75 weight percent polyol, based on the weight of the polymeric vehicle, and from about 5 to about 70 weight percent phenolic ester alcohol, based on the weight of the polymeric vehicle.

8. The polymeric vehicle as recited in claim 2 wherein the phenolic ester alcohol has the general formula

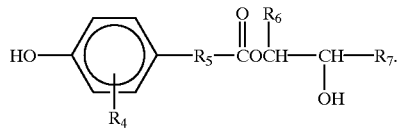

9. The polymeric vehicle as recited in claim 8, wherein the phenolic ester alcohol has the general formula:

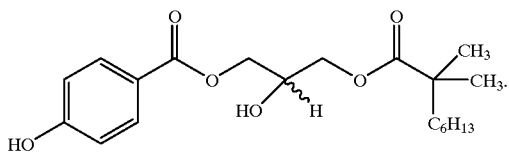

10. A polymeric vehicle as recited in claim 1, wherein the phenolic ester alcohol isocyanate compound and polyol have molecular weights effective for providing the polymeric vehicle with a viscosity in the range of from about 0.1 to about 20 Pa.s at about 20° C. to about 60° C. at a shear rate of at least about 1000 sec.$^{-1}$ in the absence of organic solvent.

11. A polymeric vehicle as recited in claim 10, wherein the isocyanate compound, polyol and phenolic ester alcohol each have molecular weights in an amount effective for and are each in relative amounts effective to provide a formulated coating composition having less than about 3.5 pounds of VOC per gallon of formulated coating composition.

12. A polymeric vehicle as recited in claim 2, wherein the polyol is selected from the group consisting of a polyester, alkyd polymer and mixtures thereof.

13. The polymeric vehicle as recited in claims 1, 7, 8 or 9, wherein the isocyanate compound has an average isocyanate functionality of from about 2 to about 3.

14. The polymeric vehicle as recited in claims 1, 7, 8 or 9, wherein the polyol is selected from the group consisting of a polyester polymer, an acrylic polymer, an alkyd polymer, and epoxy polymer and mixtures thereof.

15. The polymeric vehicle as recited in claims 1, 7, 8 or 9, wherein the polyol is a polyester polymer having a number average molecular weight in the range of from about 280 to about 30,000.

16. The polymeric vehicle as recited in claims 1, 7, 8 or 9, wherein the polyol is an acrylic polymer having a number average molecular weight in the range of from about 300 to about 5,000.

17. The polymeric vehicle as recited in claims 1, 7, 8 or 9, wherein the polyol is an alkyd polymer having a number average molecular weight in the range of from about 500 to about 20,000.

18. A polymeric vehicle comprising:

at least about 5 weight percent, based upon the weight of the polymeric vehicle, of an isocyanate compound having an average isocyanate functionality of from about 1.9 to about 20 isocyanate groups per molecule;

at least about 15 weight percent, based upon the weight of the polymeric vehicle, of a polyol having a polydispersity index greater than one and the polyol being selected from the group consisting of a polyester polymer, an acrylic polymer, an alkyd polymer, an epoxy polymer and mixtures thereof; and at least about 5 weight percent, based upon the weight of the polymeric vehicle, of a phenolic ester alcohol having at least one phenolic hydroxyl group, and at least one aliphatic hydroxyl group, the isocyanate compound being reactive with the phenolic ester alcohol and polyol, and wherein the phenolic ester alcohol has at least two ester groups and has the general formula

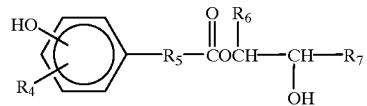

wherein $R_4$ is selected from the group consisting of hydrogen, halogen, hydroxyl, $C_1$ to $C_8$ alkyl and $C_1$ to $C_8$ alkoxy, $R_5$ is selected from the group consisting of a direct bond, $C_1$ to $C_{20}$ organic radical having only carbon and hydrogen atoms, and a $C_1$ to $C_{20}$ organic radical which includes in its structure a substitution group selected from the group consisting of phenol, aliphatic hydroxyl, ester, ether, carbonate and combinations thereof, wherein $R_6$ is selected from the group consisting of hydrogen, a $C_1$ to $C_{20}$ organic radical, a $C_1$ to $C_{20}$ organic radical which includes in its structure at least one ester linkage or a direct bond which forms with $R_7$ part of a 5 or 6 carbon atom cyclic ring structure, wherein $R_7$ is $CH_2R_8$ wherein $R_8$ is selected from the group consisting of hydroxy, $OR_9$,

and $R_{11}$, wherein $R_9$ is selected from the group consisting of a primary or secondary aliphatic group containing 3 to 20 carbon atoms, an aromatic group containing 6 to 20 carbon atoms, a primary aliphatic group containing 3 to 20 carbon atoms which includes at least one ester linkage and a secondary aliphatic group containing 3 to 20 carbon atoms which includes at least one ester linkage, wherein $R_{10}$ is selected from the group consisting of a primary aliphatic group containing 4 to 20 carbon atoms, a secondary aliphatic group containing 4 to 20 carbon atoms, a tertiary aliphatic group containing 4 to 20 carbon atoms, an aromatic group containing 6 to 20 carbon atoms, and combinations thereof, wherein the primary, secondary and tertiary aliphatic groups include at least one ester linkage; and wherein $R_{11}$ is selected from the group consisting of a $C_2$ to $C_{20}$ organic radical, a $C_2$ to $C_{20}$ organic radical which includes in its structure at least one ester linkage, a $C_2$ to $C_{20}$ organic radical which forms with $R_6$ part of a 5 or 6 carbon atom cyclic ring structure, and combinations thereof.

19. A polymeric vehicle as recited in claim 18 wherein the phenolic ester alcohol has the general formula

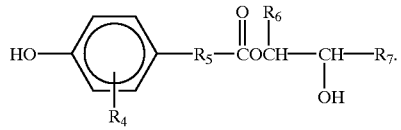

20. The polymeric vehicle as recited in claim 19 wherein the polymeric vehicle comprises from about 5 to about 40 weight percent isocyanate compound, based on the weight of the polymeric vehicle, from about 15 to about 75 weight percent polyol, based on the weight of the polymeric vehicle, and from about 5 to about 70 weight percent phenolic ester alcohol, based on the weight of the polymeric vehicle.

21. The polymeric vehicle as recited in claims 18, 19 or 20, wherein the isocyanate compound has an average isocyanate functionality of from about 2 to about 3.

22. The polymeric vehicle as recited in claims 18, 19 or 20, wherein the polyol is a polyester polymer having a number average molecular weight in the range of from about 280 to about 30,000.

23. The polymeric vehicle as recited in claims 18, 19 or 20, wherein the polyol is an acrylic polymer having a number average molecular weight in the range of from about 300 to about 5,000.

24. The polymeric vehicle as recited in claims 18, 19 or 20, wherein the polyol is an alkyd polymer having a number average molecular weight in the range of from about 500 to about 20,000.

25. The polymeric vehicle as recited in claim 21, wherein the polyol is a polyester polymer having a number average molecular weight in the range of from about 280 to about 30,000.

26. The polymeric vehicle as recited in claim 21, wherein the polyol is an acrylic polymer having a number average molecular weight in the range of from about 300 to about 5,000.

27. The polymeric vehicle as recited in claim 21, wherein the polyol is an alkyd polymer having a number average molecular weight in the range of from about 500 to about 20,000.

* * * * *